UNITED STATES PATENT OFFICE 2,084,284

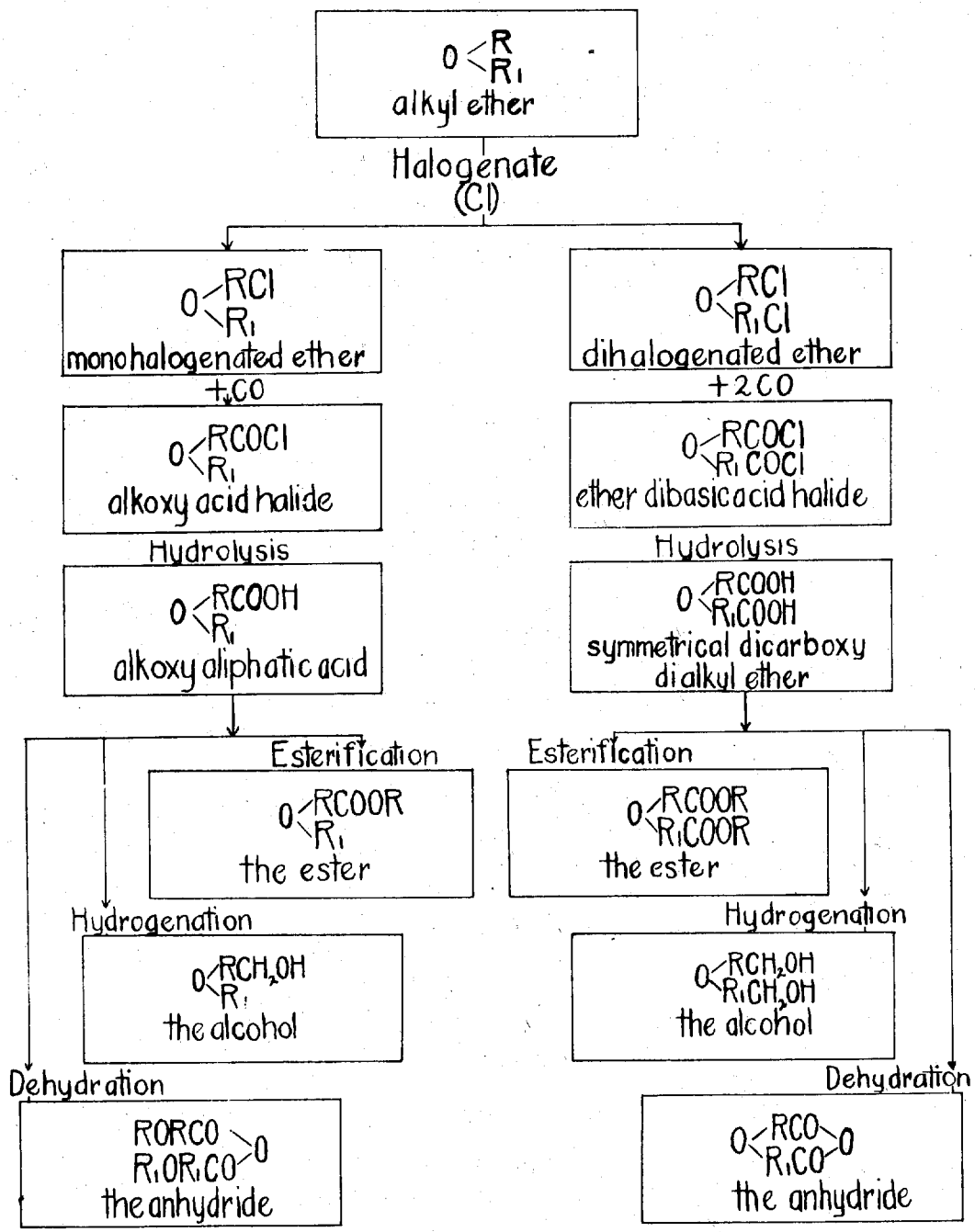

ETHER ACID HALIDES AND PROCESS OF MAKING THEM

Norman D. Scott, Niagara Falls, N. Y., assignor to E. I. du Pont de Nemours & Company, Wilmington, Del., a corporation of Delaware Application March 8, 1933, Serial No. 660,085

22 Claims. (Cl. 260—123)

This invention relates to the production of valuable organic compounds and more particularly to the preparation of ether acid halides from halogenated aliphatic ethers.

Acid chlorides may be prepared by the action of the chlorides of phosphorus PCl₃, PCl₅, and POCl₃ upon the acids or their salts. They are also sometimes prepared by the action of chlorine upon the aldehydes in the absence of water. These processes are not, however, well suited for the commercial preparation of ether-acid halides, to the preparation of which my invention is principally directed.

An object of the present invention is to provide a process for the preparation of acid halides from organic ethers, halides and carbon monoxide. Another object of the invention is to provide a process for the preparation of alkoxy acyl halides and the halides of polycarboxylic ether-acids from the halogen substituted alkyl ethers and carbon monoxide. A still further object of the present invention is to provide a process for the preparation of methoxy acetyl chloride and diglycolic acid chloride by the interaction of chlormethyl ethers with carbon monoxide. Other objects and advantages of the invention will hereinafter appear.

I have found that the halogenated aliphatic ethers and more particularly the alpha and gamma substituted aliphatic ethers will react with carbon monoxide to form the alkoxy acid halides and the diacyl halides of ether-acids. The halogenated aliphatic ethers which are suitable for use in the process include all such ethers which do not appreciably decompose under the conditions of the reaction. For example, I wish to include the following halogenated aliphatic ethers and homologous ethers: the monochlormethyl-alkyl ethers, such for example as monochlormethyl ether, alphamonochlormethylbutyl ether; and other alphamonochloralkyl ethers, such as alphamonochlordiethyl ether, alphamonochlordipropylalkyl ethers, such as dichlormethyl ether, dichlorethyl ether, etc., corresponding beta and gamma halogenated ethers are likewise suitable, e. g. dichlordiethyl ether, gammachlorpropylmethyl ether, gammachlorbutylmethyl ether, etc. The unsymmetrically substituted ethers as, for example, alpha, gammadichlormethylpropyl ether and like ethers, may be used. The preparation of many of these substituted ethers is disclosed in my copending application Ser. No. 627,539. Although the above compounds are given as the chlorides of the various ethers, it is understood that the other halides of these compounds may be used, for example, the bromide, iodide, and fluoride; the chloride due to its availability and ease with which it lends itself to this reaction is, however, generally preferred.

The products which are formed by the condensation of carbon monoxide with the halogenated ethers varies, of course, with the reactants and the conditions of the reaction. To illustrate an important product, the dimethyl ether-acid chloride, results from the condensation between monochlormethyl ether and carbon monoxide which may be represented by the following equation:

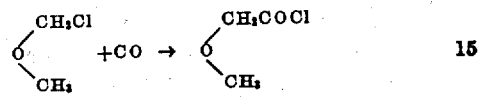

Similarly, from carbon monoxide and dichlormethyl ether diglycolic acid chloride

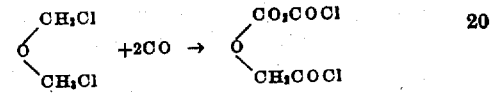

and from gammachlorpropylmethyl ether and carbon monoxide, the gammamethoxy normal butyryl chloride

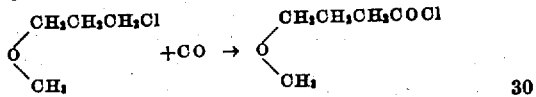

Catalysts may be used, if desired, to accelerate the reaction and may include the anhydrous halides of a number of metals such as zinc, bismuth, and antimony. I prefer to use catalysts which would be classified as easily or moderately active for the Friedel-Craft type of reaction, in order to minimize reactions decomposing the halogenated alkyl ether. A fairly wide range of temperatures and pressures is permissible, depending inter alia on the catalyst chosen and the type of ether being treated. Zinc chloride may be used dissolved in a chlormethyl ether and when used in this form it is desirable to operate at temperatures in the neighborhood of 50° C. or below, and with carbon monoxide at pressures as high as is feasible, although the reaction will proceed, to a certain extent, at ordinary temperature and pressure conditions. Inert solvents may be used, if desired, in the condensation.

The following examples further illustrate the nature of the invention, but the invention is not restricted thereto except as it may be limited by the appended claims:

*Example 1*—459 grams of a 4.67% solution of zinc chloride and chlormethyl ether was placed in a sealed autoclave of 1500 cc. capacity and shaken for 8 hours at 25–50° C. in contact with carbon monoxide at a pressure of 275–625 lbs. Analysis showed the product to contain, after hydrolysis of the methoxy acetyl chloride to methoxy acetic acid 5% of the theoretical amount of that acid.

*Example 2*—The same mixture as that given under Example 1 was shaken in the same apparatus for seven hours at a temperature of 68–86° C. and under a carbon monoxide pressure of 480–530 lbs. per square inch, the reactants were allowed to cool in the autoclave over night under the pressure of carbon monoxide. After hydrolysis of the methoxy acid chloride to methoxy acetic acid, a 6.2% yield of the latter was obtained.

*Example 3*—201 grams of monochlormethyl ether with 10 grams of aluminum chloride were placed in a steel shaker bomb of approximately 400 cc. capacity. Carbon monoxide was introduced at a pressure of 1100 lbs. per sq. in., the bomb was then purged to remove inert gases present, and the carbon monoxide again introduced at a pressure of 1100 lbs. Under this carbon monoxide pressure the tube was shaken for approximately one hour at 25° C., the temperature was then raised during a period of one hour to approximately 100° C., and the bomb shaken for eight hours. Examination of the product indicated a yield of approximately 9% methoxy acetyl chloride.

The reaction product of carbon monoxide with the halogenated ethers given is indicated in the examples as an ether-acid halide. From these acid halides a large number of organic compounds may be prepared; for example, by hydrolysis the acid is produced which may in turn be hydrogenated to the corresponding alcohol, by esterification the ester, by dehydration the anhydride; many other organic compounds may be prepared by simple reactions well known to the expert organic chemist, giving amides, ketones, etc. For example, from methoxyacetylchloride may be obtained by such known processes methoxyacetic acid, ethylene glycol monomethyl ether, esters of methoxyacetic acid, methoxy acetic anhydride, methoxyacetamide, dimethoxy methyl ketone, etc. From the diglycolic acid chloride may be obtained the corresponding compounds, diglycolic acid, diethylene glycol, esters of diglycolic acid, diglycolic anhydride, amides (or imides) of diglycolic acid, cyclic or polymeric ketones, etc. From the acid halides prepared from the other ethers like compound may be produced. The number and variety of these compounds may be appreciated by a consideration of the single figure, a chart in which the "R" and "R₁" designate similar or dissimilar alkyl, or aralkyl groupings; the halogen, although shown as chlorine, may likewise be bromine, fluorine, or iodine; furthermore, the halogen need not be substituted in the alpha position as has been described, if, of course, the "R" or "R₁" grouping contains more than one carbon atom.

In my copending application U. S. Ser. No. 627,539 I have disclosed a process of reacting halogenated ethers with olefinic hydrocarbons to produce halogenated ethers of higher molecular weight. The process therein disclosed may likewise be employed for the reaction of the olefinic hydrocarbons with the ether-acid halides, alkoxy-acid halides, acid halides of the dicarboxylic ether-acids, and homologous compounds as prepared in accord with the present invention, the olefinic hydrocarbon generally adding to the compounds between the carbon monoxide and halogen positions, e. g. from methoxy acetyl chloride and ethylene would be obtained methoxymethyl beta-chlorethyl ketone—from methoxybutyryl chloride and ethylene-methoxy-propyl-betachlorethyl ketone; from the diacid chloride of diglycolic acid and ethylene-ββ' dichlordipropionyldimethyl ether; etc.

The carbon monoxide required for the synthesis may be conveniently derived from various commercial sources, such as, for example, water-gas, producer gas, etc., by liquefaction or other means, and should likewise, for the best results, be relatively pure, it being particularly desirable to avoid the presence therein of catalyst poisons.

The halogenated ethers may be prepared in any suitable manner; for example, the monochlormethyl ether is readily made from methanol, formaldehyde, and hydrochloric acid, while both mono- and polyhalogenated ethers are readily produced by the chlorination of the dialkyl ethers.

I claim:

1. A process for the production of ether-acid halides which comprises reacting in the liquid phase a halogenated lower aliphatic ether with carbon monoxide at reaction temperature in the presence of a moderately active Friedel-Craft type catalyst.

2. A process for the production of alkoxy-acid halides which comprises reacting in the liquid phase a monohalogenated lower aliphatic ether with carbon monoxide at reaction temperature in the presence of a moderately active Friedel-Craft type catalyst.

3. A process for the production of acid halides of dicarboxylic ether acids which comprises reacting in the liquid phase a dihalogenated lower aliphatic ether with carbon monoxide at reaction temperature in the presence of a moderately active Friedel-Craft type catalyst.

4. A process for the production of ether-acid chlorides which comprises reacting in the liquid phase a chlorinated lower aliphatic ether with carbon monoxide at reaction temperature in the presence of a moderately active Friedel-Craft type catalyst.

5. A process for the production of alkoxy acid chlorides which comprises reacting in the liquid phase a monochlorinated lower aliphatic ether with carbon monoxide at reaction temperature in the presence of a moderately active Friedel-Craft type catalyst.

6. A process for the production of acid chlorides of dicarboxylic ether-acids which comprises reacting in the liquid phase a dichlorinated lower aliphatic ether with carbon monoxide at a temperature between 25° and 50° C. in the presence of a moderately active Friedel-Craft type catalyst.

7. A process for the production of methoxy acetyl chloride which comprises reacting in the liquid phase an alphamonochlormethyl ether with carbon monoxide at a temperature between 25° and 50° C. in the presence of a moderately active Friedel-Craft type catalyst.

8. A process for the production of an acid halide of a dicarboxylic ether-acid which comprises reacting in the liquid phase a symmetrical dialphadichlor lower alkyl ether with carbon monoxide at a temperature between 25° and 50° C. in the presence of a moderately active Friedel-Craft type catalyst.

9. A process for the production of an alkoxy acid chloride which comprises reacting in the liquid phase a gammachlorpropylmethyl ether with carbon monoxide at a temperature between 25° and 50° C. in the presence of a moderately active Friedel-Craft type catalyst.

10. A process which comprises reacting in the liquid phase an alpha halogenated lower aliphatic ether with carbon monoxide at a temperature between 25° and 50° C. in the presence of a moderately active Friedel-Craft type catalyst.

11. A process which comprises reacting in the liquid phase an alpha chlorinated lower aliphatic ether with carbon monoxide at a temperature between 25° and 50° C. in the presence of a moderately active Friedel-Craft type catalyst.

12. A process which comprises reacting in the liquid phase a gamma halogenated lower aliphatic ether with carbon monoxide at a temperature between 25° and 50° C. in the presence of a moderately active Friedel-Craft type catalyst.

13. A process which comprises reacting in the liquid phase a gamma chlorinated lower aliphatic ether with carbon monoxide at a temperature between 25° and 50° C. in the presence of a moderately active Friedel-Craft type catalyst.

14. A process for the production of an ether-acid halide which comprises reacting in the liquid phase a halogenated lower aliphatic ether with carbon monoxide in the presence of a metal halide catalyst at a temperature between 25° and 50° C.

15. A process for the production of an ether-acid halide which comprises reacting at a temperature between 25° and 50° C. a halogenated lower aliphatic ether with carbon monoxide in the presence of zinc chloride.

16. A process for the production of an ether-acid halide which comprises reacting at a temperature between 25° and 50° C. a halogenated lower aliphatic ether with carbon monoxide in the presence of aluminum chloride.

17. An acid halide of a dicarboxylic ether acid.
18. Diacid chloride of digylcolic acid.
19. A dibasic acid halide of dimethyl ether.

20. A process for the production of an ether-acid chloride which comprises reacting in the liquid phase, at a temperature between 25° and 50° C., a chlorinated lower aliphatic ether with carbon monoxide in the presence of a metal halide which is moderately active for the Friedel-Craft type of reaction and which is soluble in the chlorinated aliphatic ether as the catalyst for the reaction.

21. A process for the production of an alkoxy acyl halide, which comprises reacting in the liquid phase, at a temperature between 25° and 50° C., an alphamonohalogenated lower alkyl ether with carbon monoxide, in the presence of a moderately active Friedel-Craft type catalyst.

22. A process for the production of an ether-acid halide which comprises reacting in the liquid phase, at a temperature between 25° and 50° C., a gamma halogenated lower alkyl ether with carbon monoxide, in the presence of a moderately active Friedel-Craft type catalyst.

NORMAN D. SCOTT.

Certificate of Correction

Patent No. 2,084,284. June 15, 1937.

NORMAN D. SCOTT

It is hereby certified that errors appear in the printed specification of the above numbered patent requiring correction as follows: Page 1, second column, line 20, for the portion of the formula reading "$CO_2$" read $CH_2$; page 3, first column, line 32, and second column, line 4, claims 15 and 16 respectively, after "reacting" insert *in the liquid phase;* and that the said Letters Patent should be read with these corrections therein that the same may conform to the record of the case in the Patent Office.

Signed and sealed this 3rd day of August, A. D. 1937.

[SEAL]

HENRY VAN ARSDALE,
*Acting Commissioner of Patents.* liquid phase a gammachlorpropylmethyl ether with carbon monoxide at a temperature between 25° and 50° C. in the presence of a moderately active Friedel-Craft type catalyst.

10. A process which comprises reacting in the liquid phase an alpha halogenated lower aliphatic ether with carbon monoxide at a temperature between 25° and 50° C. in the presence of a moderately active Friedel-Craft type catalyst.

11. A process which comprises reacting in the liquid phase an alpha chlorinated lower aliphatic ether with carbon monoxide at a temperature between 25° and 50° C. in the presence of a moderately active Friedel-Craft type catalyst.

12. A process which comprises reacting in the liquid phase a gamma halogenated lower aliphatic ether with carbon monoxide at a temperature between 25° and 50° C. in the presence of a moderately active Friedel-Craft type catalyst.

13. A process which comprises reacting in the liquid phase a gamma chlorinated lower aliphatic ether with carbon monoxide at a temperature between 25° and 50° C. in the presence of a moderately active Friedel-Craft type catalyst.

14. A process for the production of an ether-acid halide which comprises reacting in the liquid phase a halogenated lower aliphatic ether with carbon monoxide in the presence of a metal halide catalyst at a temperature between 25° and 50° C.

15. A process for the production of an ether-acid halide which comprises reacting at a temperature between 25° and 50° C. a halogenated lower aliphatic ether with carbon monoxide in the presence of zinc chloride.

16. A process for the production of an ether-acid halide which comprises reacting at a temperature between 25° and 50° C. a halogenated lower aliphatic ether with carbon monoxide in the presence of aluminum chloride.

17. An acid halide of a dicarboxylic ether acid.

18. Diacid chloride of digylcolic acid.

19. A dibasic acid halide of dimethyl ether.

20. A process for the production of an ether-acid chloride which comprises reacting in the liquid phase, at a temperature between 25° and 50° C., a chlorinated lower aliphatic ether with carbon monoxide in the presence of a metal halide which is moderately active for the Friedel-Craft type of reaction and which is soluble in the chlorinated aliphatic ether as the catalyst for the reaction.

21. A process for the production of an alkoxy acyl halide, which comprises reacting in the liquid phase, at a temperature between 25° and 50° C., an alphamonohalogenated lower alkyl ether with carbon monoxide, in the presence of a moderately active Friedel-Craft type catalyst.

22. A process for the production of an ether-acid halide which comprises reacting in the liquid phase, at a temperature between 25° and 50° C., a gamma halogenated lower alkyl ether with carbon monoxide, in the presence of a moderately active Friedel-Craft type catalyst.

NORMAN D. SCOTT.

---

Certificate of Correction

Patent No. 2,084,284.

June 15, 1937.

NORMAN D. SCOTT

It is hereby certified that errors appear in the printed specification of the above numbered patent requiring correction as follows: Page 1, second column, line 20, for the portion of the formula reading "$CO_2$" read $CH_2$; page 3, first column, line 32, and second column, line 4, claims 15 and 16 respectively, after "reacting" insert *in the liquid phase;* and that the said Letters Patent should be read with these corrections therein that the same may conform to the record of the case in the Patent Office.

Signed and sealed this 3rd day of August, A. D. 1937.

[SEAL]

HENRY VAN ARSDALE,
*Acting Commissioner of Patents.*

Certificate of Correction

Patent No. 2,084,284.  June 15, 1937.

NORMAN D. SCOTT

It is hereby certified that errors appear in the printed specification of the above numbered patent requiring correction as follows: Page 1, second column, line 20, for the portion of the formula reading "$CO_2$" read *$CH_2$;* page 3, first column, line 32, and second column, line 4, claims 15 and 16 respectively, after "reacting" insert *in the liquid phase;* and that the said Letters Patent should be read with these corrections therein that the same may conform to the record of the case in the Patent Office.

Signed and sealed this 3rd day of August, A. D. 1937.

[SEAL]

HENRY VAN ARSDALE,
*Acting Commissioner of Patents.*